Patented Jan. 1, 1935

1,986,209

UNITED STATES PATENT OFFICE 1,986,209

COPPER ALLOY FOR BEARINGS

Frederick J. Maas, Chicago, Ill., assignor of five per cent to Albert W. Langkau, five per cent to Adolph Kokoefer, and five per cent to Edward Csar, all of Chicago, Ill.

No Drawing. Application April 20, 1934
Serial No. 721,459

2 Claims. (Cl. 75—1)

This invention relates to improvements in metal alloys, such as described in my application for Letters Patent Serial Number 653,189, filed January 23rd, 1933, having for an object to provide a copper alloy, highly advantageous and efficient for usage in the manufacture of bearings and kindred articles, for both heavy and light duty.

It is also an object of the invention to provide an alloy from which efficient bearings may be manufactured, the bearings so produced being non-corrosive and possessing unusual durability, and a maximum degree of hardness which will be maintained throughout the period of usage thereof, notwithstanding the character of operating conditions or the extent of heat transmitted thereto.

Another object of the invention is to provide a bearing metal alloy wherein its components are such that deterioration and/or disintegration of the same, because of frictional and melting losses and detrimental chemical action resulting therefrom, will be greatly reduced, hence, affording a product capable of rendering vastly improved performance.

An equally important object of the invention resides in the provision of a bearing metal alloy possessing such physical characteristics that the same, to a great extent, will be self-lubricating during actual usage.

I am aware of the prior existence of many characters or species of metal alloys recommended for manufacture of bearings and kindred articles. I am also aware that many types of bearings utilizing copper as a base, have been heretofore produced; that such bearings have included components such as lead, manganese, phosphor, tin, and zinc, which components have been fused with the copper base and have had it claimed therefor that they impart hardness to the finished product, and to some extent, lubrication.

Such alloys as I am aware of, however, have failed to adequately serve those purposes for which they were intended, especially, when the same are subjected to the stresses of actual working conditions. In this connection, it has been shown that since the melting point of copper is relatively high, and that the melting point of components such as lead, tin, and zinc are relatively low, the exposure or subjection of a bearing metal, comprehending the same, to continuous friction brings about a chemical reaction which causes the metal to lose its original degree of hardness and ductility with varying degrees of rapidity, hence, effecting deterioration or disintegration of the same, with the result that material losses result to a user thereof, both by reason of bearing failure and damaging of the shafts or other objects received therein. The latter condition is especially attributable to the liberation of particles of the bearing, which particles are gathered in by the bearing lubricant, and as the result, produce a highly damaging abrasive medium.

Through the usage of my improved non-corrosive bearing metal alloy, disadvantages such as above mentioned, as well as a number of others, are avoided. My improved non-corrosive bearing alloy is so constituted as to insure a maximum of durability and satisfactory performance, substantially maintaining its original degree of hardness and ductility, even during the application of those stresses incident to heavy duty operations. Furthermore, the improved bearing is self-lubricating, to a material extent. Additionally, usage of my improved bearing alloy over extended periods of time fails to produce the aforesaid highly undesirable abrasive lubricant refuse, that lubricant utilized in connection with said bearing being constantly maintained absolutely clear, and by consequence, eliminating shaft marking, scoring, or similar damage.

Other objects of the invention will be in part obvious and in part pointed out hereinafter.

In order that the invention and its mode of working may be properly understood by workers skilled in the art, I have, in the following detailed description set out as satisfactory embodiment of the same.

A typical formula for producing the bearing metal alloy may be stated to be as follows:

| | Per cent |
|---|---|
| Nickel | 4 |
| Calcium Molybdate | 1 |
| Iron Molybdenum | 1 |
| Aluminum | 4 |
| Copper of an amount to complete a 100% mass. | |

The nickel component of the improved alloy imparts a most desirable color tone thereto; additionally, the nickel, infusing with the other components of the alloy, serves to accord an advantageous degree of hardness to the product.

The aluminum content increases its hardness, and furthermore, greatly improves or betters the corrosion resisting properties thereof. The aluminum component also serves the alloy as an effectual lubricating medium, rendering a bearing manufactured therefrom self-lubricating to a material extent.

Corrosion resisting properties are imparted to the alloy by the usage of calcium molybdate and iron molybdenum; also, the molybdenum content of the several components renders the alloy materially less subject to deterioration, by bringing about (when fused in the alloy) a strictly homogeneous body and eliminating intercrystalline brittleness of the product when it is subjected to high temperatures. Furthermore, the molybdenum and iron content of the stated components will serve as an effectual medium for increasing the fluidity of the alloy during casting usage thereof, and will impart an advantageous degree of hardness to the finished product.

Whereas all or substantially all of the molybdenum of the calcium molybdate and iron molybdenum components will enter into the alloy, together with the iron during the alloying process, the calcium, at the temperature of the molten metal will not enter the same. To the contrary, the calcium will produce a most efficient slag for the charge during said alloying process, sealing the "heat" and by consequence, serving to prevent oxidation.

At this point, I desire to invite attention to the fact that different formulas of calcium molybdate and iron molybdenum may be used in producing my improved alloy. With regard to the calcium molybdate formula, I preferably employ one which consists of molybdenum 43.90; silicon 0.18; and calcium 55.92. The particular iron molybdenum formula utilized in the production of the alloy, preferably, is one which contains molybdenum 68.50; iron 31.20; and carbon 0.30.

The copper base of the improved alloy, through the usage of the aforesaid components therewith, is possessed of a comparatively high melting point. It also possesses good heat conductivity, hence, permitting frictionally generated heat to be evenly diffused or distributed throughout the alloy constituted product. Furthermore, it is to be understood that the ductility of the aforesaid alloy is high and that by usage of the aforesaid components in composition therewith, that a highly efficient and advantageous form of bearing will be produced. The application of continuous friction to a bearing thus constituted will not result in any detrimental chemical reaction or after crystallization, and because of this, it will be understood and appreciated by persons skilled in the art, that the period of active or satisfactory usage of a bearing so constructed will be materially prolonged.

The final alloy contains—

| | Per cent |
|---|---|
| Nickel | 3.67 |
| Molybdenum | 0.38 |
| Iron | 0.17 |
| Calcium | 0.06 |
| Aluminum | 3.41 |

Copper of an amount to complete a 100% mass.

The molybdenum and iron content of the final alloy, as will be understood, depends upon the particular formulas of calcium molybdate and ferro molybdenum introduced into the charge.

The herein exemplified formula is one capable of producing an alloy of such peculiar character that it will efficiently resist corrosion and like processes of deterioration, as well as staining. The latter feature will be found of particularly attractive advantage in connection with the manufacture of certain types of bearings. Because of its composition, the improved alloy may be economically and successfully cast, drawn, forged, rolled, spun, or otherwise fabricated in accordance with now known industrial methods.

In the foregoing formula, I have set forth a single and satisfactory embodiment of my invention. I wish to have it understood that this particular formula may be varied, according to particular manufacturing requirements. Accordingly, and with a view toward defining the range of modification of my invention, I offer herebelow, a formula which is considered to be within the province of the invention.

| | Per cent |
|---|---|
| Nickel | ½ to 10 |
| Calcium Molybdate | ½ to 10 |
| Ferro Molybdenum | ½ to 10 |
| Aluminum | ½ to 15 |

Copper of an amount to complete a 100% mass.

Final alloys constituted in accordance with the immediately foregoing range formula, will include the ingredients in those relative proportions stated immediately below:

| | Per cent |
|---|---|
| Nickel | 0.45 to 9.50 |
| Molybdenum | 0.15 to 6 |
| Iron | 0.08 to 1.50 |
| Calcium | 0.03 to 0.80 |
| Aluminum | 0.40 to 14 |

Copper of an amount to complete a 100% mass.

In certain instances, the retention of the initial hardess of the alloy, as well as the strength or resistance of the same, may be insured by subjecting the alloy to a simple process of heat treatment, to wit, by heating the alloy and then quenching or rapidly cooling the same, whereby the previously dissolved non-metallic matters of the alloy components will be brought into solid solution.

I claim:

1. A bearing alloy comprising the following elements in approximately the respective relative quantities indicated:

| | Per cent |
|---|---|
| Nickel | 3.67 |
| Aluminum | 3.41 |
| Molybdenum | 0.38 |
| Iron | 0.17 |
| Calcium | 0.06 |

Copper of an amount to complete a 100% mass.

2. A bearing alloy comprising the following elements within the respective ranges indicated:

| | Per cent |
|---|---|
| Nickel | 0.45 to 9.50 |
| Aluminum | 0.40 to 14 |
| Molybdenum | 0.15 to 6 |
| Iron | 0.08 to 1.50 |
| Calcium | 0.03 to 0.80 |

Copper of an amount to complete a 100% mass.

FREDERICK J. MAAS.